United States Patent
Li et al.

(10) Patent No.: US 11,649,375 B2
(45) Date of Patent: May 16, 2023

(54) DURABLE, ELECTRICALLY CONDUCTIVE POLYURETHANE COMPOSITIONS AND METHODS OF APPLYING SAME

(71) Applicant: GKN Aerospace Transparency Systems, Inc., Garden Grove, CA (US)

(72) Inventors: Jieming Li, Irvine, CA (US); Stephen Sandlin, Long Beach, CA (US); Marlowe Moncur, Irvine, CA (US)

(73) Assignee: GKN Aerospace Transparency Systems, Inc., Garden Grove, CA (US)

( * ) Notice: Subject to any disclaimer, the term of this patent is extended or adjusted under 35 U.S.C. 154(b) by 0 days.

(21) Appl. No.: 17/471,392

(22) Filed: Sep. 10, 2021

(65) Prior Publication Data

US 2022/0098436 A1     Mar. 31, 2022

Related U.S. Application Data

(63) Continuation of application No. 15/821,554, filed on Nov. 22, 2017, now Pat. No. 11,118,086.

(51) Int. Cl.

| | | |
|---|---|---|
| *C08J 7/043* | (2020.01) | |
| *C09D 175/06* | (2006.01) | |
| *C08G 18/42* | (2006.01) | |
| *C08G 18/75* | (2006.01) | |
| *C08G 18/48* | (2006.01) | |
| *C08G 18/46* | (2006.01) | |
| *C09D 5/24* | (2006.01) | |
| *C08G 18/32* | (2006.01) | |
| *C08G 18/66* | (2006.01) | |
| *C08J 7/044* | (2020.01) | |
| *C08J 7/046* | (2020.01) | |

(52) U.S. Cl.
CPC ....... *C09D 175/06* (2013.01); *C08G 18/3206* (2013.01); *C08G 18/4202* (2013.01); *C08G 18/4277* (2013.01); *C08G 18/4615* (2013.01); *C08G 18/4854* (2013.01); *C08G 18/664* (2013.01); *C08G 18/758* (2013.01); *C08J 7/043* (2020.01); *C08J 7/044* (2020.01); *C08J 7/046* (2020.01); *C09D 5/24* (2013.01)

(58) Field of Classification Search
CPC .......... C09D 175/06; C09D 5/24; C09D 7/63; C08G 18/3206; C08G 18/4202; C08G 18/4277; C08G 18/4615; C08G 18/4854; C08G 18/664; C08G 18/758; C08G 18/6453; C08J 7/043; C08J 7/044; C08J 7/046; C08J 7/0427; C08J 2333/00; C08J 2475/06; C08J 7/0423; C08K 5/435
See application file for complete search history.

(56) References Cited

U.S. PATENT DOCUMENTS

2012/0021209 A1*   1/2012   Moncur .................... C08J 5/12
                                                                                               156/60

\* cited by examiner

*Primary Examiner* — Michael B Nelson
(74) *Attorney, Agent, or Firm* — Sheppard, Mullin, Richter & Hampton LLP

(57) ABSTRACT

A polyurethane composition suitable for coating a surface of a substrate. The polyurethane composition can include an aliphatic polyester urethane matrix and a fluorinated ionic antistatic additive. The aliphatic polyester urethane matrix can comprise an aliphatic diisocyanate, a polyester polyol having a polyester diol and a polyester triol, and sulfonated polyester urethane polyol.

12 Claims, No Drawings

DURABLE, ELECTRICALLY CONDUCTIVE POLYURETHANE COMPOSITIONS AND METHODS OF APPLYING SAME

CROSS-REFERENCE TO RELATED APPLICATIONS

This application is a continuation of U.S. patent application Ser. No. 15/821,554 filed on Nov. 22, 2017 and entitled "DURABLE, ELECTRICALLY CONDUCTIVE TRANSPARENT POLYURETHANE COMPOSITIONS AND METHODS OF APPLYING SAME," which is incorporated herein by reference in its entirety.

FIELD OF THE INVENTION

This invention relates generally to polyurethane compositions and coated aircraft transparencies incorporating such compositions, and more particularly, to transparent polyurethane compositions having outstanding electrostatic dissipation capability, superior erosion resistance, and excellent environmental durability.

BACKGROUND

Transparencies used for modern military aircraft often require a protective, erosion-resistant coating or film located on the outer surface. Such protective outer layers are required to prevent damage to fragile underlying metal or ceramic conductive coatings, such as gold, silver, or indium tin oxide (ITO), or to protect a plastic surface having limited environmental durability, such as polycarbonate. Transparent polyurethane coatings and films are preferred for these applications due to their excellent transparency, superior erosion resistance, and good environmental durability.

The outer surface of an aircraft transparency is subject to electrostatic charging, especially with high performance modern military aircraft. This charging is caused by contact with ice crystals and other particles during flight, which results in transfer of a charge to the surface via triboelectric or frictional effects. This phenomenon is called precipitation charging, or p-static charging, in the industry.

P-static charging of a non-conductive (dielectric) outer surface of an aircraft transparency can create several serious problems affecting aircraft performance, transparency service life, and personnel safety. Discharge during flight can result in damage to outer coating layers from dielectric breakdown or can result in electronic interference with instruments. Such charge accumulation can also create shock hazards for flight and ground personnel.

To prevent these problems caused by p-static charging, the outer layer of an aircraft transparency must be sufficiently conductive to allow the charge to drain across the surface to the airframe or through the thickness of the layer to an underlying grounded conductive layer. Like most organic polymers, polyurethanes generally are poor conductors of electricity. Consequently, polyurethanes cannot be used satisfactorily without modification in applications where static dissipative properties are required.

Several methods have been used in the past to modify polyurethanes to increase their electrical conductivity, and thereby to better dissipate a buildup of static charge. In one such method, conductive fibers or particles are incorporated into the polyurethane matrix. This method is not suitable for use with polyurethanes that are transparent, however, because the conductive filler materials are opaque and greatly reduce the light transmission of the modified material.

In another method for modifying polyurethanes to increase their electrical conductivity, conductive polymers such as polyaniline or polythiophene salts are incorporated into the polyurethane matrix. Again, however, this method is not suitable for use with polyurethanes that are transparent, because the conductive polymer additives form a dispersed phase that reduces transparency. In addition, polyanilines, polythiophenes and other conductive polymers do not have good environmental stability and generally cause reduction in overall resistance to weathering and environmental degradation.

In yet another method for modifying polyurethanes to increase their electrical conductivity, hydrophilic additives such as amines and quaternary ammonium salts are used to increase the polyurethane's surface conductivity. These additives function by migrating to the polyurethane's surface, where they attract water and thereby create a conductive film. This method is not suitable for polyurethane coatings and laminates, however, because the additive also migrates to the surface of the polyurethane that interfaces with the underlying substrate, resulting in a loss of adhesion. In addition, such additives can lose their effectiveness over time, because they can leach from the polyurethane under normal use conditions.

Still other methods for modifying polyurethanes to increase their electrical conductivity, usable in the past only for polyurethane foams, call for adding in ionizable metal salts coupled with an enhancer. The preferred salt cation is an alkali or alkaline earth metal ion, and the preferred anion is the conjugate base of an inorganic acid or a C2-C4 carboxylic acid. The preferred enhancers are phosphate esters and salts or esters of fatty acids. None of these known additives for increasing the electrical conductivity of polyurethanes is considered fully satisfactory for use in polyurethanes that are transparent, and particularly in polyurethanes that are used as coatings for modern military aircraft transparencies.

In general, non-ionic additives and polyol modifiers have been found to significantly enhance electrical conductivity only if used at high levels, which can adversely affect other important properties, such as transparency and mechanical strength. Ionic additives, including quarternary ammonium salts and ionizable metal salts, generally are more effective in enhancing electrical conductivity. The most effective known additives of this kind are ionizable metal salts of perfluoroalkylsulfonates. However, none of these ionic additives is considered fully satisfactory for use in transparent polyurethanes used as coatings because they are fugitive and with aging they can cause a loss of transparency, a loss of adhesion, and a loss of conductivity.

One recent modification of transparent polyurethanes to increase their electrical conductivity is described in U.S. Pat. No. 6,458,875 to Sandlin et al., where an improved polyurethane composition incorporating a prescribed additive in the range of 0.5 to 5.0 weight percent for enhancing electrical conductivity without adversely affecting the composition's transparency and adhesion to an underlying substrate is developed. The prescribed additive is an ionizable metal salt of a perfluoroalkylsulfonimide, with the metal being an alkali metal and the preferred perfluoroalkylsulfonimide being trifluoromethanesulfonimide. The most preferred salt is lithium trifluoromethanesulfonimide as trade name Fluorad HQ 115 from 3M.

Use of Fluorad HQ 115 in the range of 1.0 to 3.0 weight percent in a preferred polyetherurethane composition can enhance the composition's electrical conductivity by about two orders of magnitude, thereby reducing the risk of a static charge building to a point where a shock hazard is created or the polyurethane coating is damaged by a rapid discharge of electrical current. The transparent polyurethanes modified with Fluorad HQ 115 are very durable in mechanical properties and demonstrate excellent erosion resistance to the detrimental effects of weathering exposure. The electrical conductivity of Fluorad HQ 115 modified transparent polyurethanes has, however, a strong temperature dependence. As temperature is reduced, conductivity and ability to dissipate accumulated surface charge drop drastically. The electrical conductivity is also sensitive to the detrimental effects of weathering exposure and can lose conductivity under normal use conditions. Since field operating modern military aircraft regularly experiences transparency surface temperatures of −40° C. or lower, electrostatic discharge capability must be maintained at low temperatures and be able to tolerate the detrimental effects of weathering exposure. The transparent polyurethane composition modified with the prescribed lithium trifluoromethanesulfonimide additive Fluorad HQ 115 is therefore considered not fully satisfactory as surface coating for transparencies used for modern military aircraft with respect to these requirements.

The most recent development addressing the problem of static charge buildup on aircraft transparencies is described in U.S. Pat. No. 9,580,564 to Moncur et al., where a multi-layer coating system comprising a first transparent polyurethane inner layer, a middle conductive layer disposed on the first transparent polyurethane inner layer, and a second transparent polyurethane outer layer disposed on the conductive layer is developed. The middle conductive layer lies between the inner and outer polyurethane layers and is formed by coating the first transparent polyurethane inner layer with a colloidal indium tin oxide nanoparticle dispersion which may be cured with a silicate binder to form a mesh or porous network that allows the outer polyurethane layer to interact and bond with the inner polyurethane layer through the porous network. The first transparent polyurethane inner layer is relatively thicker and formed by applying an approximately 70-percent-solids-content aliphatic polyesterurethane precursor solution to the transparent substrate, followed by evaporation of the solvent and thermal cure of the precursors. The second transparent polyurethane outer layer is relatively thinner and formed by applying an approximately 45-percent-solids-content aliphatic polyesterurethane precursor solution to the conductive layer, followed by evaporation of the solvent and thermal cure of the precursors. The solids content of both polyurethane precursor solutions may be adjusted to give the desired layer thickness and will depend upon the properties of the particular polyurethane used.

This multi-layer coating system addresses the problem of static charge buildup on aircraft transparencies via a "drain across" mechanism, which allows surface static charge to drain through the second transparent polyurethane layer to the conductive material layer and then to the edge of the conductive material layer, where it is mated to the airframe. This "drain across" multi-layer coating system demonstrates efficiencies in dissipating surface static charge buildup on aircraft transparencies and maintains high p-static dissipation performance regardless temperature change or weathering exposure. The multi-layer coating system, however, suffers from weak erosion resistance and experiences loss of the outer polyurethane layer during vigorous rain erosion testing. Delamination during the rain erosion test occurs because the interaction between the outer polyurethane layer and the inner polyurethane layer through the porous network of the middle conductive material layer can't provide sufficient bonding between these two polyurethane layers to withstand test conditions. Therefore, the multi-layer coating system is considered not fully satisfactory as surface coating for transparencies used for modern military aircraft with respect to the erosion resistance requirement.

It can readily be appreciated that there is a need for a transparent polyurethane composition with enhanced electrical conductivity that can be applied over the outer surface of modern military aircraft transparencies to provide the transparencies with a protective layer having outstanding electrostatic dissipation capability at all operational temperatures, superior erosion resistance, and excellent environmental durability. The present invention fulfills this need and provides further related advantages.

BRIEF SUMMARY OF THE INVENTION

The present invention is embodied in a polyurethane composition suitable for coating a surface of a substrate. In one embodiment, the composition includes an aliphatic polyester urethane matrix and a fluorinated ionic antistatic additive. The aliphatic polyester urethane matrix comprises an aliphatic diisocyanate, a polyester polyol having a polyester diol and a polyester triol, and sulfonated polyester urethane polyol. Each feature or concept is independent, but can be combined with any other feature of concept disclosed in this application.

In one embodiment, the aliphatic diisocyanate is selected from a group consisting of: hexamethylene diisocyanate, methylene bis (4-cyclohexylisocyanate), and isophorone diisocyanate. In another embodiment, the aliphatic diisocyanate comprises methylene bis (4-cyclohexylisocyanate). Each feature or concept is independent, but can be combined with any other feature of concept disclosed in this application.

In any one of the preceding embodiments, the polyester diol can comprise a polycaprolactone diol. In one embodiment, the polycaprolactone diol is initiated with a compound selected from a group consisting of: 1,4-butanediol, diethylene glycol, and neopentyl glycol. In another embodiment, the polyester diol has an average molecular weight from about 400 g/mol to about 4,000 g/mol. In a further embodiment, the polyester diol has an average molecular weight of about 830 g/mol and comprises a polycaprolactone diol initiated with diethylene glycol. Each feature or concept is independent, but can be combined with any other feature of concept disclosed in this application.

In any one of the preceding embodiments, the polyester triol can comprise a polycaprolactone triol. In one embodiment, the polycaprolactone triol is initiated with trimethylol propane. In another embodiment, the polyester triol has an average molecular weight from about 300 g/mol to about 3,000 g/mol. In a further embodiment, the polyester triol has an average molecular weight of about 540 g/mol and comprises a polycaprolactone triol initiated with trimethylol propane. Each feature or concept is independent, but can be combined with any other feature of concept disclosed in this application.

In any one of the preceding embodiments, the polyester polyol can further comprise a chain extender. In one embodiment, the chain extender is selected from a group consisting of: ethylene glycol, 1,4-butanediol, and 2-ethyl-1,3-hexanediol. Each feature or concept is independent, but can be combined with any other feature of concept disclosed in this application.

In any one of the preceding embodiments, the sulfonated polyester urethane polyol can comprise an anionic dispersion of an aliphatic polyester urethane resin. In one embodiment, the sulfonated polyester urethane polyol is about 3% to about 15%, by weight, of the composition. In another embodiment, the sulfonated polyester urethane polyol is from about 5% to about 10%, by weight, of the composition. Each feature or concept is independent, but can be combined with any other feature of concept disclosed in this application.

In any one of the preceding embodiments, the aliphatic polyester urethane matrix can be about 85% to about 98%, by weight, of the composition. In one embodiment, the aliphatic polyester urethane matrix is from about 88% to about 95%, by weight, of the composition. Each feature or concept is independent, but can be combined with any other feature of concept disclosed in this application.

In any one of the preceding embodiments, the fluorinated ionic antistatic additive can comprise a quaternary ammonium salt of a fluorinated sulfonimide. In one embodiment, the quaternary ammonium salt of a fluorinated sulfonimide is selected from a group consisting of: tri-n-butylmethylammonium bis-(trifluoromethanesulfonyl)imide and quaternary alkyl ammonium bis-(trifluoromethanesulfonyl)imide. In another embodiment, the quaternary ammonium salt of a fluorinated sulfonimide comprises tri-n-butylmethylammonium bis-(trifluoromethanesulfonyl)imide. In a further embodiment, the fluorinated ionic antistatic additive is from about 1% to about 10%, by weight, of the composition. In an additional embodiment, the fluorinated ionic antistatic additive is from about 3% to about 8%, by weight, of the composition. Each feature or concept is independent, but can be combined with any other feature of concept disclosed in this application.

In any one of the preceding embodiments, the composition can further comprise a catalyst selected from a group consisting of: dibutyltin dilaurate and dibutyltin diacetate. In one embodiment, the catalyst is from about 0.001% to about 0.02%, by weight, of the composition. In another embodiment, the catalyst is from about 0.003% to about 0.01%, by weight, of the composition. Each feature or concept is independent, but can be combined with any other feature of concept disclosed in this application.

In any one of the preceding embodiments, the composition can further comprise a package of stabilizers. In one embodiment, the package of stabilizers comprises one or more of a UV absorber, a light stabilizer, and a thermal stabilizer. In another embodiment, the package of stabilizers comprises the UV absorber, the light stabilizer, and the thermal stabilizer. In a further embodiment, the UV absorber is selected from a group consisting of: hydroxyphenyl-triazine, hydroxyphenyl-benzotriazole, and hydroxyphenyl-benzophenone. In an additional embodiment, the light stabilizer comprises a hindered amine light stabilizer. In yet another embodiment, the thermal stabilizer comprises a sterically hindered phenolic antioxidant. In one embodiment, the thermal stabilizer comprises pentaerythritol tetrakis(3-(3,5-di-tert-butyl-4-hydroxyphenyl)propionate). In another embodiment, the package of stabilizers is from about 0.5% to about 4%, by weight, of the composition. In a further embodiment, the package of stabilizers is from about 1% to about 3%, by weight, of the composition. Each feature or concept is independent, but can be combined with any other feature of concept disclosed in this application.

In any one of the preceding embodiments, the composition can further comprise a first surfactant. In one embodiment, the first surfactant comprises polyalkyleneoxide modified heptamethyltrisiloxane. In another embodiment, the first surfactant is from about 0.05% to about 1%, by weight, of the composition. In a further embodiment, the first surfactant is from about 0.1% to about 0.5%, by weight, of the composition. Each feature or concept is independent, but can be combined with any other feature of concept disclosed in this application.

In any one of the preceding embodiments including the first surfactant, the composition can further comprise a second surfactant. In one embodiment, the second surfactant comprises a polyether-modified polydimethylsiloxane or a polyester-modified, hydroxy-functional polydimethylsiloxane. In another embodiment, the second surfactant comprises a polyester-modified, hydroxy-functional polydimethylsiloxane. In a further embodiment, the second surfactant is from about 0.05% to about 1%, by weight, of the composition. In an additional embodiment, the second surfactant is from about 0.1% to about 0.5%, by weight, of the composition. Each feature or concept is independent, but can be combined with any other feature of concept disclosed in this application.

In any one of the preceding embodiments, the composition can further comprise an aprotic solvent. In one embodiment, the aprotic solvent is selected from a group consisting of: n-pentyl propionate, ethyl 3-ethoxypropionate, 2-butoxyethyl acetate, di-isobutyl ketone, and methyl isobutyl ketone. Each feature or concept is independent, but can be combined with any other feature of concept disclosed in this application.

The present invention also is embodied in a method of preparing a polyurethane composition suitable for coating a surface of a substrate. In one embodiment, the method includes mixing a polyester diol and a polyester triol with a sulfonated polyester urethane dispersion to form a homogeneous sulfonated polyol mix; and mixing the homogenous sulfonated polyol mix with components comprising an aliphatic diisocyanate, a fluorinated ionic antistatic additive, and a catalyst, to form the polyurethane coating composition. Each feature or concept is independent, but can be combined with any other feature of concept disclosed in this application.

In one embodiment, the sulfonated polyester urethane dispersion is mixed with the polyester diol and the polyester triol at about 90° C. to about 105° C. for about 48 hours. In another embodiment, the polyester diol has an average molecular weight of about 830 g/mol and comprises a polycaprolactone diol initiated with diethylene glycol. In a further embodiment, the polyester triol has an average molecular weight of about 540 g/mol and comprises a polycaprolactone triol initiated with trimethylol propane. In an additional embodiment, the sulfonated polyester urethane dispersion comprises an anionic dispersion of an aliphatic polyester urethane resin. In yet another embodiment, the sulfonated polyester urethane dispersion is from about 5% to about 10%, by weight, of the composition. Each feature or concept is independent, but can be combined with any other feature of concept disclosed in this application.

In one embodiment, the aliphatic diisocyanate comprises methylene bis (4-cyclohexylisocyanate). In another embodiment, the fluorinated ionic antistatic additive comprises tri-n-butylmethylammonium bis-(trifluoromethanesulfonyl) imide. In a further embodiment, the fluorinated ionic antistatic additive is from about 3% to about 8%, by weight, of the composition.

In one embodiment, the catalyst comprises dibutyltin dilaurate. In another embodiment, the catalyst is from about 0.003% to about 0.01%, by weight, of the composition. Each feature or concept is independent, but can be combined with any other feature of concept disclosed in this application.

In one embodiment, the components further comprise: an aprotic solvent, a package of stabilizers, a first surfactant, and a second surfactant. In another embodiment, the aprotic solvent comprises n-pentyl propionate. In a further embodiment, the package of stabilizers comprises a UV absorber, a light stabilizer, a thermal stabilizer. In an additional embodiment, the UV absorber is selected from a group consisting of: hydroxyphenyl-triazine, hydroxyphenyl-benzotriazole, and hydroxyphenyl-benzophenone. In yet another embodiment, the light stabilizer comprises a hindered amine light stabilizer. In one embodiment, the thermal stabilizer comprises a sterically hindered phenolic antioxidant. In another embodiment, the package of stabilizers is from about 1% to about 3%, by weight, of the composition. In a further embodiment, the polyurethane composition comprises about 70% solids. Each feature or concept is independent, but can be combined with any other feature of concept disclosed in this application.

The present invention also is embodied in a method of applying a coating to a surface of a substrate. In one embodiment, the method includes coating the surface with the polyurethane composition of any one of the preceding embodiments directed to polyurethane compositions. In one embodiment, the method further comprises curing the coated surface at a first cure temperature from about 50° C. to about 60° C. for about 12 hours, and re-curing the coated surface at a second cure temperature from about 75° C. to about 85° C. for about 24 hours. Each feature or concept is independent, but can be combined with any other feature of concept disclosed in this application.

The present invention is embodied in another method of applying a coating to a surface of a substrate. In one embodiment, the method includes coating the surface with the polyurethane compositions prepared by the method of any one of the preceding embodiments directed to the method of preparing the polyurethane composition. In one embodiment, the method further comprises curing the coated surface at a first cure temperature from about 50° C. to about 60° C. for about 12 hours, and re-curing the coated surface at a second cure temperature from about 75° C. to about 85° C. for about 24 hours. Each feature or concept is independent, but can be combined with any other feature of concept disclosed in this application.

In any one of the preceding embodiments directed to the method of applying the coating to the surface of the substrate, the substrate can be acrylic. In one embodiment, the substrate is transparent. In another embodiment, the first cure temperature is about 54° C. In a further embodiment, the second cure temperature is about 82° C. Each feature or concept is independent, but can be combined with any other feature of concept disclosed in this application.

In any one of the preceding embodiments directed to the method of applying the coating to the surface of the substrate, the method can further comprise a step of preparing the surface before coating it with the transparent polyurethane composition. In one embodiment, the preparing step comprises coating the surface with a polysiloxane coating to form a base-coated surface; coating the base-coated surface with a three-layer indium tin oxide (ITO)/gold/ITO film stack to form a ITO-coated surface; coating the ITO-coated surface with a 0.1% silicate coating solution to form a silicate-coated surface; heating the silicate-coated surface at about 82° C. for about 1 hour; coating the silicate-coated surface with a 0.1% aminosilane primer solution to form an aminosilane-coated surface; coating the aminosilane-coated surface with a 18% polyurethane thermoset adhesive solution to form a polyurethane thermoset-coated surface; and curing the polyurethane thermoset-coated surface at about 20° C. to about 25° C. for about 16 hours. Each feature or concept is independent, but can be combined with any other feature of concept disclosed in this application.

In any one of the preceding embodiments directed to the method of applying the coating to the surface of the substrate, the 18% polyurethane thermoset adhesive solution can comprise a solvent selected from a group consisting of: cyclohexanone and 3-ethoxypropionate. Each feature or concept is independent, but can be combined with any other feature of concept disclosed in this application.

The present invention also is embodied in a laminate comprising a substrate having a surface, and a coating of a polyurethane composition disposed on the surface. In one embodiment, the polyurethane composition can be any one of the preceding polyurethane compositions. In another embodiment, the coating can be applied to the surface by any one of the preceding methods of applying the coating to the surface of the substrate. Each feature or concept is independent, but can be combined with any other feature of concept disclosed in this application.

In one embodiment, the coating has a thickness from about 75 μm to about 100 μm. In another embodiment, the coating has an electrical volume resistivity less than or equal to about $10^{11}$ ohm/cm at about −40° C. In a further embodiment, the coating has a luminous transmittance from about 65% to about 70%. In an additional embodiment, the coating has a haze from about 0.90% to about 1.40%. In yet another embodiment, the coating does not include ionizable metal salts of perfluoroalkylsulfonate. In one embodiment, the coating does not include a colloidal indium tin oxide nanoparticle dispersion. In another embodiment, the substrate is acrylic. In a further embodiment, the substrate is transparent. In a further embodiment, the coating is transparent. In an additional embodiment, the surface is an outer surface of an aircraft transparency. Each feature or concept is independent, but can be combined with any other feature of concept disclosed in this application.

Other features and advantages of the invention should become apparent from the following description of the preferred embodiments, which illustrate, by way of example, the principles of the invention.

DETAILED DESCRIPTION OF THE PREFERRED EMBODIMENTS

The present invention relates to a transparent polyurethane composition with substantially enhanced electrical conductivity. In one embodiment, the transparent polyurethane composition comprises: (1) A thermally curable aliphatic polyester urethane matrix containing sulfonate salt functionality in the range of about 85 to about 98 weight percent as main body of the transparent polyurethane composition. This urethane polymer is made by reacting an aliphatic diisocyanate, a polyester diol, optionally a polyester triol, and polyester urethane diol and triol mixture containing sulfonate salt functional groups in backbone; (2) a hydrophobic fluorinated ionic antistatic additive tri-n-butylmethylammonium bis-(trifluoromethanesulfonyl) imide, available as trade name FC-4400 from 3M, in the range of about 1 to about 10 weight percent for electrical conductivity enhancement; (3) a catalyst in the range of about 10 to about 200 ppm for curing the thermoset polyurethane composition; (4) a package of stabilizers including a UV absorber, a light stabilizer, and a thermal stabilizer in the range of about 0.5 to about 4 weight percent for environmental durability enhancement; (5) optional surface active agents or surfactants for flow/leveling control and enhancing coating surface cosmetics, and (6) optional aprotic solvent as the composition carrier.

Thermal Curable Aliphatic Polyester Urethane Matrix

A thermal curable aliphatic polyester urethane matrix formed from aliphatic isocyanates, polyester polyols (mixture of triols/diols) and sulfonate salt containing urethane polyester polyols serves as the main body of the transparent polyurethane composition. Aliphatic polyester urethanes are favorited since they offer excellent resistance to chemicals, abrasion and weather. Representative liquid monomeric aliphatic or cycloaliphatic diisocyanates that are suitable for this invention include hexamethylene diisocyanate, methylene bis (4-cyclohexylisocyanate), and isophorone diisocyanate. The preferred diisocyanate for this invention is methylene bis (4-cyclohexylisocyanate), available from Covestro as Desmodur W. Representative polyester triols that are suitable for this invention include the polycaprolactone-based Capa 3031, Capa 3041, Capa 3050, Capa 3091, Capa 3121, Capa 3201, and Capa 3301, with average molecular weight (g/mol) in the range of about 300 to about 3000, available from Perstorp Specialty Chemicals. The preferred polyester triol for this invention is Capa 3050 having average molecular weight (g/mol) of about 540. Representative polyester diols that are suitable for this invention include polycaprolactone-based Capa 2043, Capa 2054, Capa 2085, Capa 2100, Capa 2125, Capa 2205, Capa 2304, and Capa 2402, with average molecular weight (g/mol) in the range of about 400 to about 4000, available from Perstorp Specialty Chemicals. The preferred polyester diol for this invention is Capa 2085 having average molecular weight (g/mol) of about 830. A chain extender such as ethylene glycol, 1,4-butanediol (BDO), 2-ethyl-1,3-hexanediol (EHD) can be optionally added in the polyols for performance adjustment. The polyurethane matrix containing sulfonate salt functionality is typically used in the range of about 85% to about 98%, and more typically in the range of about 88% to about 95% weight percent, based on the total weight of solids in the composition. In one embodiment, the polyurethane matrix containing sulfonate salt functionality is about 85%, about 86%, about 87%, about 88%, about 89%, about 90%, about 91%, about 92%, about 93%, about 94%, about 95%, about 96%, about 97%, or about 98%, by weight, of the composition. In another embodiment, the polyurethane matrix is in a range defined by any two of the preceding values.

Hydrophobic Fluorinated Ionic Antistatic Additive

A hydrophobic fluorinated ionic antistatic additive is formulated in the polyurethane composition for electrical conductivity enhancement. Proper selection of the antistatic additive allow the composition to demonstrate high electrical conductivity and meet the p-static dissipation requirements of coated transparencies. In the past, salt of quaternary ammonium cation or salt of fluorinated sulfonimide anion was used as antistatic additive to enhance electrical conductivity of polyurethanes with limited success, such as the examples described in U.S. Pat. No. 6,458,875. The advantage to use a single compound of quaternary ammonium cation combined with fluorinated sulfonimide anion as antistatic additive in a polyurethane composition for electrical conductivity enhancement has never been explored. The hydrophobic fluorinated ionic antistatic additive FC-4400 and FC-5000 are salts containing both a quaternary ammonium cation and a fluorinated sulfonimide anion. The combination of a quaternary ammonium cation with a fluorinated sulfonimide anion as a single compound makes FC-4400 or FC-5000 more efficient for electrical conductivity enhancement. In addition, the hydrophobic fluorinated ionic antistatic additive FC-4400 or FC-5000 is fully compatible with other components in the polyurethane composition and thus can be loaded in a wide range of weight percent without compromising the composition's other performance capabilities. FC-4400 is an ionic liquid antistatic salt of quaternary ammonium cation with fluorinated sulfonimide anion of tri-n-butylmethylammonium bis-(trifluoromethanesulfonyl)imide with formula $(n-C_4H_9)_3(CH_3)N+\textrm{---}N(SO_2CF_3)_2$. FC-5000 is an ionic liquid antistatic salt of quaternary ammonium cation with fluorinated sulfonimide anion with single primary alcohol group on quaternary ammonium with formula $R_4N+\textrm{---}N(SO_2CF_3)_2$. The preferred hydrophobic fluorinated ionic antistatic additive for this invention is FC-4400. The hydrophobic fluorinated ionic antistatic additive is typically used in the range of about 1% to about 10%, and more typically in the range of about 3% to about 8% weight percent, based on the total weight of solids in the composition. In one embodiment, the hydrophobic fluorinated ionic antistatic additive is about 1%, about 2%, about 3%, about 4%, about 5%, about 6%, about 7%, about 8%, about 9%, or about 10%, by weight, of the composition. In another embodiment, the hydrophobic fluorinated ionic antistatic additive is in a range defined by any two of the preceding values.

Sulfonated Polyester Urethane Polyols

A polyester urethane polyol having sulfonate ionic functional groups incorporated in the backbone is used to interact with the hydrophobic fluorinated ionic antistatic additive FC-4400 or FC-5000 additive. The sulfonated polyester urethane polyol has multiple sulfonate ionic functional groups in the backbone and hydroxyl functionalities in the chain ends. The sulfonated polyester urethane polyol can be cured into the polyurethane matrix via the chain end hydroxyl functionalities while the sulfonate ionic functional groups in the backbone can bond with the ionic groups of the hydrophobic fluorinated ionic antistatic additive via ionic interaction so as to form a stable crosslinked network in which the hydrophobic fluorinated ionic antistatic additive is evenly distributed in the polyurethane matrix. A synergetic interaction between the sulfonated polyester urethane polyol and the hydrophobic fluorinated ionic antistatic additive substantially enhances electrical conductivity of the polyurethane composition. In the meantime, the formation of stable crosslinked network prevents the hydrophobic fluorinated ionic antistatic additive from being lost so that the transparent polyurethane can tolerate the detrimental effects of weathering exposure and remains high electrical conductivity. Sulfonated polyester urethane polyols are prepared by reacting non-sulfonated polyols with a sulfonated polyester urethane. Representative sulfonated polyester urethanes that are suitable for this invention include Bayhydrol 140 AQ, Bayhydrol UH 240, Baybond PU 402A, and Impranil DL 1554, available from Bayer Material Science, now Covestro. The preferred sulfonated polyester urethane polyol for this invention is Bayhydrol 140 AQ, which is a 40% solids water dispersion of sulfonated aliphatic anionic polyester urethane resin. These materials are available as aqueous dispersions, and are reacted with non-sulfonated polyols with removal of the water to yield sulfonated polyols. The sulfonated polyester urethane is typically used in the range of about 3% to about 15%, and more typically in the range of 5% to 10% weight percent, based on the total weight of solids in the composition. In one embodiment, the sulfonated polyester urethane is about 3%, about 4%, about 5%, about 6%, about 7%, about 8%, about 9%, about 10%, about 11%, about 12%, about 13%, about 14%, or about 15%, by weight, of the composition. In another embodiment, the sulfonated polyester urethane is in a range defined by any two of the preceding values.

A Catalyst for Curing the Polyurethane Composition

A catalyst is used for curing the thermoset polyurethane composition. The catalyst accelerates the polyurethane network formation. Representative catalysts that are suitable for this invention include organo-metallic compounds dibutyltin dilaurate and dibutyltin diacetate available from Sigma-Aldrich, and Bismuth and Zinc compounds available from Shepherd Chemical Company. The catalyst is typically used in the range of about 10 ppm to about 200 ppm, and more typically in the range of about 30 ppm to about 100 ppm, based on the total weight of solids in the composition. In one embodiment, the catalyst about 10 ppm, about 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, 150 ppm, 160 ppm, 170 ppm, 180 ppm, 190 ppm, or 200 ppm, by weight of the composition. In another embodiment, the catalyst is in a range defined by any two of the preceding values.

A Package of Stabilizers

A package of stabilizers including a UV absorber, a light stabilizer, and a thermal stabilizer is formulated in the composition for environmental durability enhancement. The package of stabilizers provide effective stabilization against the detrimental effects of light and weathering.

The UV absorber is typically a hydroxyphenyl-triazine, hydroxyphenyl-benzotriazole or hydroxyphenyl-benzophenone class compound. The UV absorber competitively absorbs the UV light that is harmful to the polyurethane composition. Representative UV absorbers that are suitable for this invention include Tinuvin 400, Tinuvin 405, Tinuvin 460, Tinuvin 477, and Tinuvin 479 of the hydroxyphenyl-triazine class and Tinuvin 928, Tinuvin 1130, Tinuvin 328, Tinuvin 99-2, and Tinuvin 384-2 of the hydroxyphenyl-benzotriazole class, available from BASF. The preferred UV absorber for this invention is Tinuvin 479 having extremely high extinction coefficient in the UV-B and UV-A range. The high extinction coefficient allows formulation of the composition with reduced UV absorber content.

The light stabilizer is typically a hindered amine light stabilizer (HALS). It is capable of trapping free radicals and acts as radical scavengers in the autoxidation cycle and inhibits the photo-oxidative degradation of polymeric materials. Representative light stabilizers that are suitable for this invention include Tinuvin 123, Tinuvin 144, Tinuvin 152, Tinuvin 292, or Tinuvin 5100, available from BASF. The preferred light stabilizer for this invention is Tinuvin 152 having reactive primary hydroxyl which enables Tinuvin 152 to be cured into the polyurethane networks so as to improve compatibility and resistance to migration.

The thermal stabilizer is typically a sterically hindered phenolic antioxidant that protects the composition against thermo-oxidative degradation. Representative thermal stabilizers that are suitable for this invention include IRGANOX 1010, IRGANOX 1076, IRGANOX 1135, or IRGANOX 245, available from BASF. Low color, good compatibility, high resistance to extraction, and low volatility are typical selecting standard for the thermal stabilizer for application in this composition, and IRGANOX 1010 is the preferred one.

The stabilizer's protective effects are enhanced when used in combination as a package of stabilizers. The package of stabilizers with combination of Tinuvin 479/Tinuvin 152/IRGANOX 1010 provides the most effective stabilization against the detrimental effects of light and weathering. The package of stabilizers is typically used in the range of about 0.5% to about 4%, and more typically in the range of about 1% to about 3% weight percent, based on the total weight of solids in the composition. In one embodiment, the package of stabilizers is about 0.5%, about 1%, about 1.5%, about 2%, about 2.5%, about 3%, about 3.5%, or about 4%, by weight, of the composition. In another embodiment, the package of stabilizers is in a range defined by any two of the preceding values.

Surface Active Agents

Surface active agents or surfactants, which control the wetting or spreading action of the coating, provide the coating surfaces with a satisfactory flow-and-leveling properties, eliminate coating defects such as ruptures and craters, and increase surface slip are favorably used in the composition. Representative surfactants that are suitable for this invention include silicone-based flow/leveling agents Silwet L-77, L-7200, L-7600, L-7604, L-7605, and L-7657 available from Momentive Performance Materials, and silicone-based surface additives BYK-300, BYK-306, BYK-313, BYK-333, BYK-370, and BYK-378 available from BYK Chemie. The Silwet silicone surfactants are modified trisiloxanes with outstanding wetting, spreading and leveling properties. The powerful Silwet L-77 that combines a very low molecular weight trisiloxane with a polyether group is preferred for this invention. The BYK silicone surface additives are modified polydimethylsiloxanes for increasing surface slip. The reactive BYK-370 that is a polyester modified hydroxyl functional polydimethylsiloxane is preferred for this invention. BYK-370 can be crosslinked into the polyurethane networks via its primary OH— groups and can increase the surface slip permanently. Synergistically use of Silwet L-77 with BYK-370 provides a great combination of spreading/flow/leveling and permanent surface slip enhancement. Each surfactant is typically used in the range of about 0.05% to about 1%, more typically in the range of about 0.1% to about 0.5% weight percent, based on the total weight of solids in the composition. In one embodiment, each surfactant is about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1.0%, by weight, of the composition. In another embodiment, each surfactant is in a range defined by any two of the preceding values.

Optional Solvent

Optionally, an aprotic solvent can be used to mix the composition and serve as the composition carrier. Representative aprotic solvents that are suitable for this invention include n-pentyl propionate (nPP), ethyl 3-ethoxypropionate (EEP), 2-butoxyethyl acetate (BEA), di-isobutyl ketone (DIBK), and methyl isobutyl ketone (MIBK). The weight percent of the optional aprotic solvent can be varied, depending on the required coating thickness when the composition is flow coated onto the outer surface of aircraft transparencies.

Performance Highlights Versus State-of-Art Polyurethanes

The polyurethane compositions of this invention can be conveniently flow coated over the outer surface of transparencies used for modern military aircraft, which contain an outer surface electrically conductive coating, to provide the transparencies with a protective layer having outstanding electrostatic dissipation capability at all operational temperatures, superior erosion resistance, and excellent environmental durability. Table 1 highlights the performances of electrical conductivity and rain erosion resistance for a polyurethane composition of this invention and the state-of-art systems as described in U.S. Pat. Nos. 6,458,875 and 9,580,564. Electrical volume resistivity measured at about −6° C., about −28° C., and about −40° C. for samples without QUV exposure and after 5 weeks QUV exposure are presented. Rain erosion resistance results after about 10 min, about 30 min, and about 60 min at about 927 km/h for samples without QUV exposure and after 5 weeks QUV exposure are presented. The accelerated QUV equipment was operated in a cycle of about 50° C./about 7 hours UV exposure and about 50° C./about 5 hours condensation (UV off, high humidity) with UVB-313 EL fluorescent lamps. Electrical volume resistivity>$10^{14}$ means the sample's resistivity is unmeasurable or the sample experiences dielectric breakdown during p-static dissipation testing. "Pass" means coating loss is less than 10% after test. "Fail" means coating loss is more than 10% after test. Both samples have an electrically conductive gold stack coating as described in the examples.

substantial electrical conductivity enhancement. The hydrophobic fluorinated ionic antistatic additive FC-4400 is believed to strongly interact with the sulfonate functional groups so that the high conductivity and p-static dissipation capability can be maintained after detrimental effects of weathering exposure.

Methods of Preparing the Polyurethane Composition

The present invention also is embodied in a method of preparing a polyurethane composition suitable for coating a surface of a substrate. In one embodiment, the method includes mixing a polyester diol and a polyester triol with a sulfonated polyester urethane dispersion to form a homogeneous sulfonated polyol mix; and mixing the homogenous sulfonated polyol mix with components comprising an aliphatic diisocyanate, a fluorinated ionic antistatic additive, and a catalyst, to form the polyurethane coating composition.

In one embodiment, the sulfonated polyester urethane dispersion is mixed with the polyester diol and the polyester triol at about 90° C. to about 105° C. for about 48 hours. In another embodiment, the polyester diol has an average molecular weight of about 830 g/mol and comprises a polycaprolactone diol initiated with diethylene glycol. In a

TABLE 1

Performance Highlights

| Type of polyurethane compositions | Volume resistivity for samples without QUV exposure, ohm-cm | | | Volume resistivity for samples after 5 weeks QUV exposure, ohm-cm | | | Rain erosion resistance for samples without QUV exposure, 927 km/h | | | Rain erosion resistance for samples after 5 weeks QUV exposure1, 927 km/h | | |
|---|---|---|---|---|---|---|---|---|---|---|---|---|
| | −6° C. | −28° C | −40° C | −6° C. | −28° C. | −40° C. | 10 min | 30 min | 60 min | 10 min | 30 min | 60 min |
| Prior art compositions of U.S Pat. No. 6,458,875 | $10^{11}$ | $10^{13}$ | >$10^{14}$ | >$10^{14}$ | >$10^{14}$ | >$10^{14}$ | Pass | Pass | Pass | Pass | Pass | Pass |
| Prior art compositions of U.S Pat. No. 9,580,564 | $10^{12}$ | $10^{12}$ | $10^{12}$ | $10^{12}$ | $10^{12}$ | $10^{12}$ | Pass | Fail | Fail | Fail | Fail | Fail |
| Compositions of this invention | $10^{7}$ | $10^{9}$ | $10^{10}$ | $10^{9}$ | $10^{10}$ | $10^{11}$ | Pass | Pass | Pass | Pass | Pass | Pass |

Although the transparent polyurethanes modified with lithium trifluoromethanesulfonimide additive Fluorad HQ 115 as described in U.S. Pat. No. 6,458,875 enhance electrical conductivity and therefore improve electrostatic discharge capability, the improved electrostatic discharge capability is not maintained at low temperatures and is unable to tolerate the detrimental effects of weathering exposure. On the other hand, the "drain across" multi-layer coating system as described in U.S. Pat. No. 9,580,564 demonstrates efficiencies in dissipating surface static charge buildup on aircraft transparencies and maintains high p-static dissipation performance regardless temperature change or weathering exposure, but it suffers weak erosion resistance as well as outer polyurethane layer loss during vigorous rain erosion testing. Neither of these prior art systems is considered fully satisfactory as surface coating for transparencies used for modern military aircraft.

The polyurethane composition of embodiments that combine sulfonate salt functionality in the backbone and incorporate a hydrophobic fluorinated ionic antistatic additive tri-n-butylmethylammonium bis-(trifluoromethanesulfonyl) imide FC-4400 as an additive demonstrates substantially enhanced electrical conductivity and therefore can maintain high p-static dissipation capability as surface coating for aircraft transparencies at all operational temperatures. A synergetic interaction between the hydrophobic fluorinated ionic antistatic additive FC-4400 and the sulfonated polyester urethane matrix is believed to be responsible for this further embodiment, the polyester triol has an average molecular weight of about 540 g/mol and comprises a polycaprolactone triol initiated with trimethylol propane. In an additional embodiment, the sulfonated polyester urethane dispersion comprises an anionic dispersion of an aliphatic polyester urethane resin. In yet another embodiment, the sulfonated polyester urethane dispersion is from about 5% to about 10%, by weight, of the composition.

In one embodiment, the aliphatic diisocyanate comprises methylene bis (4-cyclohexylisocyanate). In another embodiment, the fluorinated ionic antistatic additive comprises tri-n-butylmethylammonium bis-(trifluoromethanesulfonyl) imide. In a further embodiment, the fluorinated ionic antistatic additive is from about 3% to about 8%, by weight, of the composition.

In one embodiment, the catalyst comprises dibutyltin dilaurate. In another embodiment, the catalyst is from about 0.003% to about 0.01%, by weight, of the composition.

In one embodiment, the components further comprise: an aprotic solvent, a package of stabilizers, a first surfactant, and a second surfactant. In another embodiment, the aprotic solvent comprises n-pentyl propionate. In a further embodiment, the package of stabilizers comprises a UV absorber, a light stabilizer, and a thermal stabilizer. In an additional embodiment, the UV absorber is selected from a group consisting of: hydroxyphenyl-triazine, hydroxyphenyl-benzotriazole, and hydroxyphenyl-benzophenone. In yet another embodiment, the light stabilizer comprises a hindered amine light stabilizer. In one embodiment, the thermal stabilizer comprises a sterically hindered phenolic antioxidant. In another embodiment, the package of stabilizers is from about 1% to about 3%, by weight, of the composition. In a further embodiment, the polyurethane composition comprises about 70% solids.

Methods of Applying a Coating

The present invention also is embodied in a method of applying a coating to a surface of a substrate. In one embodiment, the method includes coating the surface with any one of the novel polyurethane compositions described above. The method further comprises curing the coated surface at a first cure temperature from about 50° C. to about 60° C. for about 12 hours, and re-curing the coated surface at a second cure temperature from about 75° C. to about 85° C. for about 24 hours.

The present invention is embodied in another method of applying a coating to a surface of a substrate. In one embodiment, the method includes coating the surface with the polyurethane compositions prepared by any one of the methods, described above, for preparing the polyurethane compositions. The method further comprises curing the coated surface at a first cure temperature from about 50° C. to about 60° C. for about 12 hours, and re-curing the coated surface at a second cure temperature from about 75° C. to about 85° C. for about 24 hours.

For any one of these methods of applying the coating to the surface of the substrate, the substrate can be acrylic. In one embodiment, the substrate is transparent. In another embodiment, the first cure temperature is about 54° C. In a further embodiment, the second cure temperature is about 82° C.

For any one of these methods of applying the coating to the surface of the substrate, the method can further comprise a step of preparing the surface before coating it with the transparent polyurethane composition. In one embodiment, the preparing step comprises coating the surface with a polysiloxane coating to form a base-coated surface; coating the base-coated surface with a three-layer indium tin oxide (ITO)/gold/ITO film stack to form a ITO-coated surface; coating the ITO-coated surface with a 0.1% silicate coating solution to form a silicate-coated surface; heating the silicate-coated surface at about 82° C. for about 1 hour; coating the silicate-coated surface with a 0.1% aminosilane primer solution to form an aminosilane-coated surface; coating the aminosilane-coated surface with a 18% polyurethane thermoset adhesive solution to form a polyurethane thermoset-coated surface; and curing the polyurethane thermoset-coated surface at about 20° C. to about 25° C. for about 16 hours.

For any one of these methods of applying the coating to the surface of the substrate, the 18% polyurethane thermoset adhesive solution can comprise a solvent selected from a group consisting of: cyclohexanone and 3-ethoxypropionate.

A Laminate

The present invention also is embodied in a laminate comprising a substrate having a surface, and a coating of a polyurethane composition disposed on the surface. In one embodiment, the polyurethane composition can be any one of the novel polyurethane compositions described above. In another embodiment, the coating can be applied to the surface by any one of the methods described above for applying the coating to the surface of the substrate.

In one embodiment, the coating has a thickness from about 75 µm to about 100 µm. In another embodiment, the coating has an electrical volume resistivity less than or equal to about $10^{11}$ ohm/cm at about −40° C. In a further embodiment, the coating has a luminous transmittance from about 65% to about 70%. In an additional embodiment, the coating has a haze from about 0.90% to about 1.40%. In yet another embodiment, the coating does not include ionizable metal salts of perfluoroalkylsulfonate. In one embodiment, the coating does not include a colloidal indium tin oxide nanoparticle dispersion. In another embodiment, the substrate is acrylic. In a further embodiment, the substrate is transparent. In a further embodiment, the coating is transparent. In an additional embodiment, the surface is an outer surface of an aircraft transparency.

It should be appreciated from the foregoing description that the present invention provides a polyurethane composition that is suitable as surface coating for aircraft transparencies. Coatings of the polyurethane composition can maintain high p-static dissipation performance regardless temperature change or weathering exposure, thereby avoiding the risk of a static charge building to a point where a shock hazard is created or the polyurethane coating is damaged by a rapid discharge of electrical current. The transparent polyurethanes of this invention are also very durable and demonstrate excellent erosion resistance and retention of mechanical properties after weathering exposure.

Specific methods, devices, and materials are described, although any methods and materials similar or equivalent to those described can be used in the practice or testing of the present invention. Unless defined otherwise, all technical and scientific terms used in this application have the same meanings as commonly understood by one of ordinary skill in the art to which this invention belongs.

As used in this application, singular words such as "a" and "an" mean "one or more" unless clear intent is shown to limit the element to "one." The term "about" means ±2% of the value it modifies.

As used in this application, the term "hydrophobic" means lacking an affinity for water, and a surface considered hydrophobic when the water contact angle is at least about 80 degrees.

As used in this application, the term "transparent" means having light transmission of at least about 85% when measured on a film of the polyurethane having a thickness of about 255 µm to about 510 µm using the ASTM D1003 standard.

Without further elaboration, it is believed that one skilled in the art, using the proceeding description, can make and use the present invention to the fullest extent. Other objectives, features, and advantages of the present embodiments will become apparent from the following specific examples. The specific examples, while indicating specific embodiments, are provided by way of illustration only. Accordingly, the present invention also includes those various changes and modifications within the spirit and scope of the invention that may become apparent to those skilled in the art from this detailed description. The following examples are illustrative only, and are not limiting of the disclosure in any way whatsoever.

EXAMPLES

Aircraft-grade (per MIL-PRF-25690) stretched acrylic sheets of dimension 38.1 cm×81.28 cm were prepared using the procedure described in U.S. Pat. No. 6,458,875 to serve as substrates for evaluating the transparent polyurethane compositions in the following examples. The preparation procedure can be summarized as follows. The acrylic sheets are first coated with a conventional polysiloxane hard coating as a base coating. The base-coated acrylic sheets are then coated with a three-layer indium tin oxide (ITO)/gold/ITO thin film stack, using a sputtering process, to a sheet resistance of about 15 ohms/square. A 0.1% silicate coating solution is then flow coated over the ITO surface coating, air dried for about 1 hour, and then heated in an air oven at about 82° C. for about 1 hour. A 0.1% aminosilane primer solution is then flow coated over the silicate coating and air dried for about 1 hour. A 18% polyurethane thermoset adhesive solution in cyclohexanone, 3-ethoxypropionate (EEP), or other suitable solvent prepared from a moisture-curable aromatic polyetherurethane based on methylene diphenyl diisocyanate (MDI) and polytetramethylene oxide polyols, is flow coated over the primed ITO coated surface and cured at room temperature for overnight.

Table 2 summarizes the electrical volume resistivity results for the polyurethane compositions described in Examples 1-7, below. Electrical volume resistivity greater than $10^{14}$ means the sample's resistivity is unmeasurable or the sample experiences dielectric breakdown during p-static dissipation testing.

lamps. Electrical volume resistivity for samples without QUV exposure and after 5 weeks QUV exposure is measured at about −6° C., about −28° C., and about −40° C. using the method described in ASTM D-257. Electrical volume resistivity results are presented in Table 2, above. The results show that incorporation of the sulfonated polyester urethane polyols from Bayhydrol 140 AQ in the composition can enhance electrical conductivity if compared to the composition without Bayhydrol 140 AQ as described in U.S. Pat. No. 6,458,875. This conductivity enhancement is an additive effect from Fluorad HQ 115 and Bayhydrol 140 AQ without a strong synergetic interaction between these two components. This conductivity enhancement cannot provide the polyurethane with sufficient p-static dissipation capability at low temperatures or to tolerate the detrimental effects of weathering exposure. From separated experiments it is also observed that increasing the concentration of hydrophilic additive Fluorad HQ 115 in the composition has limited effect on electrical conductivity and induces haze to the composition.

TABLE 2

Electrical Volume Resistivity Results for Compositions of Examples 1-7

| Compositions | Volume resistivity for samples without QUV exposure, ohm-cm | | | Volume resistivity for samples after 5 weeks QUV exposure, ohm-cm | | |
|---|---|---|---|---|---|---|
| | −6° C. | −28° C. | −40° C. | −6° C. | −28° C. | −40° C. |
| Prior art compositions of U.S Pat. No. 6,458,875 | $10^{11}$ | $10^{13}$ | $>10^{14}$ | $>10^{14}$ | $>10^{14}$ | $>10^{14}$ |
| Example 1 (comparative) | $6.4 \times 10^{10}$ | $6.6 \times 10^{11}$ | $>10^{14}$ | $>10^{14}$ | $>10^{14}$ | $>10^{14}$ |
| Example 2 (comparative) | $4.4 \times 10^{10}$ | $1.6 \times 10^{12}$ | $>10^{14}$ | $>10^{14}$ | $>10^{14}$ | $>10^{14}$ |
| Example 3 | $1.8 \times 10^{8}$ | $7.3 \times 10^{9}$ | $8.7 \times 10^{10}$ | $9.2 \times 10^{9}$ | $2.1 \times 10^{11}$ | $2.8 \times 10^{11}$ |
| Example 4 | $2.4 \times 10^{7}$ | $9.1 \times 10^{8}$ | $1.3 \times 10^{10}$ | $8.4 \times 10^{9}$ | $2.3 \times 10^{11}$ | $6.3 \times 10^{11}$ |
| Example 5 | $9.0 \times 10^{7}$ | $3.9 \times 10^{9}$ | $3.9 \times 10^{10}$ | $9.5 \times 10^{9}$ | $8.2 \times 10^{10}$ | $3.3 \times 10^{11}$ |
| Example 6 | $3.2 \times 10^{7}$ | $1.3 \times 10^{9}$ | $2.1 \times 10^{10}$ | $1.3 \times 10^{9}$ | $9.1 \times 10^{10}$ | $4.7 \times 10^{11}$ |
| Example 7 | $1.6 \times 10^{7}$ | $9.6 \times 10^{8}$ | $2.5 \times 10^{10}$ | $2.0 \times 10^{9}$ | $4.0 \times 10^{10}$ | $2.8 \times 10^{11}$ |

Example 1

An aliphatic polyester urethane composition containing lithium trifluoromethanesulfonimide additive Fluorad HQ 115 for electrical conductivity enhancement as described in U.S. Pat. No. 6,458,875 is modified with Bayhydrol 140 AQ as the formulation presented in Table 3. Bayhydrol 140 AQ is a 40% solids water dispersion of sulfonated polyester urethane polyols having sulfonate ionic functional groups incorporated in the backbone and hydroxyl functionalities in the chain ends. Bayhydrol 140 AQ is first reacted with other polyols by mixing at about 93° C. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor mix. The resulting polyurethane precursor mix is flow coated over the prepared acrylic substrates followed by curing at about 54° C. for about 12 hours and then at about 82° C. for about 24 hours to form a transparent polyurethane topcoat with thickness approximately 75-100 μm. Samples of the coated acrylics are exposed to accelerated QUV for 5 weeks. The accelerated QUV equipment is operated in a cycle of about 50° C. for about 7 hours of UV exposure and about 50° C. for about 5 hours of condensation (UV off, high humidity) with UVB-313 EL fluorescent

TABLE 3

| Polyurethane Composition of Example 1 | | |
|---|---|---|
| Raw Material | Description | Parts (wt.) |
| Desmodur W | Methylene bis (4-cyclohexylisocyanate) | 34.24 |
| CAPA 3050 | Polycaprolactone triol | 38.71 |
| CAPA 2085 | Polycaprolactone diol | 14.66 |
| 1,4-Butanediol | Chain extender | 0.31 |
| Bayhydrol 140 AQ | Sulfonated polyester urethane | 8.72 |
| Fluorad HQ 115 | Lithium trifluoromethanesulfonimide | 0.87 |
| Tinuvin 479 | UV absorber | 0.87 |
| Tinuvin 152 | Light stabilizer | 0.44 |
| Irganox 1010 | Antioxidant thermal stabilizer | 0.44 |
| Silwet L-77 | Flow/leveling agent | 0.30 |
| BYK-370 | Surface additive | 0.44 |
| Total | | 100.00 |

Example 2

An aliphatic polyester urethane composition comparable to that described in U.S. Pat. No. 6,458,875, except that the hydrophilic lithium trifluoromethanesulfonimide additive Fluorad HQ 115 is replaced by the hydrophobic fluorinated ionic antistatic additive tri-n-butylmethylammonium bis-(trifluoromethanesulfonyl) imide FC-4400, is formulated with about 50 ppm dibutyltin dilaurate catalyst in n-pentyl propionate solvent to form a 70% solids transparent polyurethane precursor as presented in Table 4. The resulting polyurethane precursor mix is flow coated over the prepared acrylic substrates followed by curing at about 54° C. for about 12 hours and then at about 82° C. for about 24 hours to form a transparent polyurethane topcoat with thickness approximately 75-100 μm. Samples of the coated acrylics are exposed to accelerated QUV for 5 weeks. Procedures for QUV exposure are described in Example 1. Electrical volume resistivity for samples without QUV exposure and after 5 weeks QUV exposure is measured at about −6° C., about −28° C., and about −40° C. using the method described in ASTM D-257. Electrical volume resistivity results are presented in Table 2, above. The results show that the hydrophobic fluorinated ionic antistatic additive FC-4400 is more efficient than the hydrophilic additive Fluorad HQ 115 for electrical conductivity enhancement of the composition, but this conductivity enhancement can't provide the polyurethane with sufficient p-static dissipation capability at low temperatures or tolerate the detrimental effects of weathering exposure.

TABLE 4

Polyurethane Composition of Example 2

| Raw Material | Description | Parts (wt.) |
|---|---|---|
| Desmodur W | Methylene bis (4-cyclohexylisocyanate) | 35.54 |
| CAPA 3050 | Polycaprolactone triol | 39.14 |
| CAPA 2085 | Polycaprolactone diol | 18.10 |
| FC-4400 | Fluorinated ionic antistatic additive | 4.60 |
| Tinuvin 479 | UV absorber | 0.92 |
| Tinuvin 152 | Light stabilizer | 0.46 |
| Irganox 1010 | Antioxidant thermal stabilizer | 0.46 |
| Silwet L-77 | Flow/leveling agent | 0.32 |
| BYK-370 | Surface additive | 0.46 |
| | Total | 100.00 |

Example 3

An aliphatic polyester urethane composition containing the hydrophobic fluorinated ionic antistatic additive tri-n-butylmethylammonium bis-(trifluoromethanesulfonyl)imide FC-4400 and the sulfonated polyester urethane polyols Bayhydrol 140 AQ is prepared as the formulation set forth in Table 5. The sulfonated polyester urethane dispersion Bayhydrol 140 AQ is first reacted with other polyols by mixing at about 93° C. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor. The resulting polyurethane precursor is flow coated over the prepared acrylic substrates followed by curing at about 54° C. for about 12 hours and then at about 82° C. for about 24 hours to form a transparent conductive topcoat with thickness approximately 75-100 μm. Samples of the coated acrylics are exposed to accelerated QUV for about 5 weeks. Procedures for QUV exposure are described in Example 1. Electrical volume resistivity for samples without QUV exposure and after about 5 weeks QUV exposure is measured at about −6° C., about −28° C., and about −40° C. using the method described in ASTM D-257. Electrical volume resistivity results are presented in Table 2, above. The results show that incorporation of the hydrophobic fluorinated ionic antistatic additive FC-4400 with the sulfonated polyester urethane polyols Bayhydrol 140 AQ in the composition can substantially enhance electrical conductivity that is significantly higher than that on the FC-4400 technical data sheet provided by the supplier 3M. A synergetic interaction between the hydrophobic fluorinated ionic antistatic additive FC-4400 and the sulfonated polyester urethane matrix is believed to be responsible for this substantial electrical conductivity enhancement. The enhanced electrical conductivity is able to tolerate temperature change or the detrimental effects of weathering exposure and maintains high p-static dissipation performance for the polyurethane regardless temperature change or weathering exposure.

TABLE 5

Polyurethane Composition of Example 3

| Raw Material | Description | Parts (wt.) |
|---|---|---|
| Desmodur W | Methylene bis (4-cyclohexylisocyanate) | 33.08 |
| CAPA 3050 | Polycaprolactone triol | 37.40 |
| CAPA 2085 | Polycaprolactone diol | 14.17 |
| 1,4-Butanediol | Chain extender | 0.30 |
| Bayhydrol 140 AQ | Sulfonated polyester urethane | 8.43 |
| FC-4400 | Fluorinated ionic antistatic additive | 4.22 |
| Tinuvin 479 | UV absorber | 0.84 |
| Tinuvin 152 | Light stabilizer | 0.42 |
| Irganox 1010 | Antioxidant thermal stabilizer | 0.42 |
| Silwet L-77 | Flow/leveling agent | 0.30 |
| BYK-370 | Surface additive | 0.42 |
| | Total | 100.00 |

Example 4

A transparent aliphatic polyester urethane composition with increased content of the hydrophobic fluorinated ionic antistatic additive FC-4400 is prepared as the formulation set forth in Table 6 for further exploring the synergetic interaction between the hydrophobic fluorinated ionic antistatic additive FC-4400 and the sulfonated polyester urethane polyols from Bayhydrol 140 AQ. The sulfonated polyester urethane dispersion Bayhydrol 140 AQ is first reacted with other polyols by mixing at about 93° F. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor. The resulting polyurethane precursor is flow coated over the prepared acrylic substrates followed by curing at about 54° C. for about 12 hours and then at about 82° C. for about 24 hours to form a transparent conductive topcoat with thickness approximately 75-100 μm. Samples of the coated acrylics are exposed to accelerated QUV for about 5 weeks. Procedures for QUV exposure are described in Example 1. Electrical volume resistivity for samples without QUV exposure and after about 5 weeks QUV exposure is measured at about −6° C., about −28° C., and about −40° C. using the method described in ASTM D-257. Electrical volume resistivity results are presented in Table 2, above. The results show that increasing the hydrophobic fluorinated ionic antistatic additive FC-4400 content can further enhance the composition's overall electrical conductivity. The enhanced electrical conductivity is able to tolerate temperature change or the detrimental effects of weathering exposure and maintains high p-static dissipation performance for the polyurethane regardless temperature change or weathering exposure.

TABLE 6

Polyurethane Composition of Example 4

| Raw Material | Description | Parts (wt.) |
|---|---|---|
| Desmodur W | Methylene bis (4-cyclohexylisocyanate) | 32.54 |
| CAPA 3050 | Polycaprolactone triol | 36.79 |
| CAPA 2085 | Polycaprolactone diol | 13.93 |
| 1,4-Butanediol | Chain extender | 0.30 |
| Bayhydrol 140 AQ | Sulfonated polyester urethane | 8.29 |
| FC-4400 | Fluorinated ionic antistatic additive | 5.80 |
| Tinuvin 479 | UV absorber | 0.83 |
| Tinuvin 152 | Light stabilizer | 0.41 |
| Irganox 1010 | Antioxidant thermal stabilizer | 0.41 |
| Silwet L-77 | Flow/leveling agent | 0.29 |
| BYK-370 | Surface additive | 0.41 |
| | Total | 100.00 |

Example 5

An aliphatic polyester urethane composition comparable to that described in Example 3, except that the chain extender 1,4-Butanediol (BDO) is removed from the composition, is prepared as the formulation set forth in Table 7. The sulfonated polyester urethane dispersion Bayhydrol 140 AQ is first reacted with other polyols by mixing at about 93° C. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor. The resulting polyurethane precursor is flow coated over the prepared acrylic substrates followed by curing at about 54° C. for about 12 hours and then at about 82° C. for about 24 hours to form a transparent conductive topcoat with thickness approximately 75-100 μm. Samples of the coated acrylics are exposed to accelerated QUV for about 5 weeks. Procedures for QUV exposure are described in Example 1. Electrical volume resistivity for samples without QUV exposure and after about 5 weeks QUV exposure is measured at about −6° C., about −28° C., and about −40° C. using the method described in ASTM D-257. Electrical volume resistivity results are presented in Table 2, above. The results show that removal of the chain extender 1,4-Butanediol from the composition has positive effects on electrical conductivity. The enhanced electrical conductivity is able to tolerate temperature change or the detrimental effects of weathering exposure and maintains high p-static dissipation performance for the polyurethane regardless temperature change or weathering exposure.

TABLE 7

Polyurethane Composition of Example 5

| Raw Material | Description | Parts (wt.) |
|---|---|---|
| Desmodur W | Methylene bis (4-cyclohexylisocyanate) | 32.55 |
| CAPA 3050 | Polycaprolactone triol | 35.84 |
| CAPA 2085 | Polycaprolactone diol | 16.57 |
| Bayhydrol 140 AQ | Sulfonated polyester urethane | 8.43 |
| FC-4400 | Fluorinated ionic antistatic additive | 4.21 |
| Tinuvin 479 | UV absorber | 0.84 |
| Tinuvin 152 | Light stabilizer | 0.42 |

TABLE 7-continued

Polyurethane Composition of Example 5

| Raw Material | Description | Parts (wt.) |
|---|---|---|
| Irganox 1010 | Antioxidant thermal stabilizer | 0.42 |
| Silwet L-77 | Flow/leveling agent | 0.30 |
| BYK-370 | Surface additive | 0.42 |
| | Total | 100.00 |

Accelerated QUV Exposure

Samples of the transparent polyurethane coated acrylics were tested for light transmission, percent haze, percent adhesion, and overall appearance with accelerated QUV exposure for up to about 5 weeks. The accelerated QUV equipment was operated in a cycle of about 50° C. for about 7 hours of UV exposure and about 50° C. for about 5 hours of condensation (UV off, high humidity) with UVB-313 EL fluorescent lamps. Testing samples were removed from the QUV equipment weekly to check percent light transmission, percent haze, percent adhesion, and overall appearance. Percent light transmission and percent haze were measured according to ASTM D-1003. Percent adhesion was measured according to ASTM D-3359. Testing results for samples of Example 5 are presented in Table 8. The results show the polyurethane exhibits substantially no degradation in light transmission, percent haze, percent adhesion, and overall appearance during the QUV exposure and shows excellent environmental durability against the detrimental effects of light and weathering.

TABLE 8

Accelerated QUV Exposure of Polyurethane Topcoat

| Sample of Example 5 | % LT | % Haze | % Adhesion | Appearance |
|---|---|---|---|---|
| Initial | 66.93 | 0.90 | 100 | Good |
| 1 week QUV exposure | 67.48 | 1.17 | 100 | Good |
| 2 weeks QUV exposure | 66.87 | 1.25 | 100 | Good |
| 3 weeks QUV exposure | 67.33 | 1.39 | 100 | Good |
| 4 weeks QUV exposure | 67.54 | 1.22 | 100 | Good |
| 5 weeks QUV exposure | 67.26 | 1.38 | 100 | Good |

Rain Erosion

Samples of the transparent polyurethane coated acrylics without QUV exposure and after 5 weeks QUV exposure were tested for rain erosion resistance. Four samples were prepared from the coated acrylics with or without UV exposure. The coated acrylics were first cut into about 2.54 cm× about 2.54 cm× about 0.635 cm dimension then step machined across the upper edge, filled with gray elastomeric material flush to remaining sample surface, about 0.238 cm thick by about 0.476 cm wide to fit with the tester holder. Rain erosion test parameters were about 30 degree impact angle, about 2.54 cm/h rainfall, and about 927 km/h test velocity. Sample pairs were tested at the edge of a zero lift centripetal arm. Average rain drop size was about 2.0 mm. Test samples were inspected before testing, after about 10 minutes, about 30 minutes, and about 60 minutes of exposure for topcoat delamination or damage. Testing results for samples of Example 5 are presented in Table 9. The results show the polyurethane topcoat exhibits superior erosion resistance with or without QUV exposure.

TABLE 9

Rain Erosion Testing of Polyurethane Topcoat

| Specimen of Example 5 | Initial Inspection | 10 Minute Exposure | 30 Minute Exposure | 60 Minute Exposure |
| --- | --- | --- | --- | --- |
| No QUV-1 | Sample slightly oversize, sanded to fit | Pass, no coating loss | Pass, no coating loss | Pass, <2% coating loss |
| No QUV-2 | Sample slightly oversize, sanded to fit | Pass, no coating loss | Pass, no coating loss | Pass, minor coating loss |
| No QUV-3 | Sample slightly oversize, sanded to fit | Pass, no coating loss | Pass, ~1% coating loss | Pass, <3% coating loss |
| No QUV-4 | Sample slightly oversize, sanded to fit | Pass, no coating loss | Pass, minor coating loss | Pass, minor coating loss |
| QUV-1 | Sample slightly oversize, sanded to fit | Pass, no coating loss | Pass, no coating loss | Pass, minor coating loss |
| QUV-2 | Sample slightly oversize, sanded to fit | Pass, no coating loss | Pass, no coating loss | Pass, <3% coating loss |
| QUV-3 | Sample slightly oversize, sanded to fit | Pass, no coating loss | Pass, <1% coating loss | Pass, <1% coating loss |
| QUV-4 | Sample slightly oversize, sanded to fit | Pass, no coating loss | Pass, <1% coating loss | Pass, ~8% coating loss |

Example 6

A transparent aliphatic polyester urethane composition without the chain extender 1,4-Butanediol (BDO) is prepared as the formulation set forth in Table 10 with increased content of the hydrophobic fluorinated ionic antistatic additive FC-4400 in the composition. The sulfonated polyester urethane dispersion Bayhydrol 140 AQ is first reacted with other polyols by mixing at about 93° C. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor. The resulting polyurethane precursor is flow coated over the prepared acrylic substrates followed by curing at about 54° C. for about 12 hours and then at about 82° C. for about 24 hours to form a transparent conductive topcoat with thickness approximately 75-100 μm. Samples of the coated acrylics are exposed to accelerated QUV for about 5 weeks. Procedures for QUV exposure are described in Example 1. Electrical volume resistivity for samples without QUV exposure and after about 5 weeks QUV exposure is measured at about −6° C., about −28° C., and about −40° C. using the method described in ASTM D-257. Electrical volume resistivity results are presented in Table 2, above. The results show that increasing the hydrophobic fluorinated ionic antistatic additive FC-4400 content in the composition has positive effects on electrical conductivity. The enhanced electrical conductivity is able to tolerate temperature change or the detrimental effects of weathering exposure and maintains high p-static dissipation performance for the polyurethane regardless temperature change or weathering exposure.

TABLE 10

Polyurethane Composition of Example 6

| Raw Material | Description | Parts (wt.) |
| --- | --- | --- |
| Desmodur W | Methylene bis (4-cyclohexylisocyanate) | 31.62 |
| CAPA 3050 | Polycaprolactone triol | 35.72 |
| CAPA 2085 | Polycaprolactone diol | 16.21 |
| Bayhydrol 140 AQ | Sulfonated polyester urethane | 8.29 |
| FC-4400 | Fluorinated ionic antistatic additive | 5.81 |
| Tinuvin 479 | UV absorber | 0.83 |
| Tinuvin 152 | Light stabilizer | 0.41 |
| Irganox 1010 | Antioxidant thermal stabilizer | 0.41 |
| Silwet L-77 | Flow/leveling agent | 0.29 |
| BYK-370 | Surface additive | 0.41 |
| | Total | 100.00 |

Example 7

A transparent aliphatic polyester urethane composition with higher content of FC-4400 and Bayhydrol 140 AQ is prepared as the formulation set forth in Table 11 for further exploring the synergetic interaction between the hydrophobic fluorinated ionic antistatic additive FC-4400 and the sulfonated polyester urethane polyols from Bayhydrol 140 AQ. The sulfonated polyester urethane dispersion Bayhydrol 140 AQ is first reacted with other polyols by mixing at about 93° C. to about 104° C. for about 48 hours to remove water content and form a homogeneous sulfonated polyol mix. The sulfonated polyol mix is then formulated with isocyanate and other components with about 50 ppm dibutyltin dilaurate catalyst in n-pentyl propionate solvent to form a 70% solids transparent polyurethane precursor. The resulting polyurethane precursor is flow coated over the prepared acrylic substrates followed by curing at about 54° C. for about 12 hours and then at about 82° C. for about 24 hours to form a transparent conductive topcoat with thickness approximately 75-100 μm. Samples of the coated acrylics are exposed to accelerated QUV for about 5 weeks. Procedures for QUV exposure are described in Example 1. Electrical volume resistivity for samples without QUV exposure and after about 5 weeks QUV exposure is measured at about −6° C., about −28° C., and about −40° C. using the method described in ASTM D-257. Electrical volume resistivity results are presented in Table 2, above. The results show that maximizing content of the hydrophobic fluorinated ionic antistatic additive FC-4400 and the sulfonated polyester urethane dispersion Bayhydrol 140 AQ in the composition has positive effects on electrical conductivity. The enhanced electrical conductivity is able to tolerate temperature change or the detrimental effects of weathering exposure and maintains high p-static dissipation performance for the polyurethane regardless temperature change or weathering exposure.

TABLE 11

Polyurethane Composition of Example 7

| Raw Material | Description | Parts (wt.) |
| --- | --- | --- |
| Desmodur W | Methylene bis (4-cyclohexylisocyanate) | 30.73 |
| CAPA 3050 | Polycaprolactone triol | 33.84 |
| CAPA 2085 | Polycaprolactone diol | 15.64 |
| Bayhydrol 140 AQ | Sulfonated polyester urethane | 9.55 |
| FC-4400 | Fluorinated ionic antistatic additive | 7.96 |
| Tinuvin 479 | UV absorber | 0.80 |
| Tinuvin 152 | Light stabilizer | 0.40 |

TABLE 11-continued

Polyurethane Composition of Example 7

| Raw Material | Description | Parts (wt.) |
|---|---|---|
| Irganox 1010 | Antioxidant thermal stabilizer | 0.40 |
| Silwet L-77 | Flow/leveling agent | 0.28 |
| BYK-370 | Surface additive | 0.40 |
| | Total | 100.00 |

The invention has been described in detail with reference only to the presently preferred embodiments. Persons skilled in the art will appreciate that various modifications can be made without departing from the invention. Accordingly, the invention is defined only by the following claims.

The invention claimed is:

1. A polyurethane composition suitable for coating a surface of a substrate, the composition comprising:
   an aliphatic polyester urethane matrix; and
   a fluorinated ionic antistatic additive;
   wherein the composition has an electrical volume resistivity of less than or equal to about $10^{11}$ ohm/cm at about −40° C. when it is coated on the surface of the substrate, wherein the aliphatic polyester urethane matrix comprises a sulfonated polyester urethane polyol, and wherein the fluorinated ionic antistatic additive comprises a quaternary ammonium salt of a fluorinated sulfonimide.

2. The polyurethane composition of claim 1, wherein the aliphatic polyester urethane matrix further comprising an aliphatic diisocyanate and a polyester polyol including a polyester diol and a polyester triol.

3. A method of coating a surface of a substrate with a polyurethane composition, the method comprising:
   flow coating the surface with the polyurethane composition of claim 1 to form a coated surface.

4. The method of claim 3, wherein the surface is an outer surface of an aircraft transparency.

5. A laminate comprising:
   a coating disposed on a surface of a substrate;
   wherein the coating comprises an aliphatic polyester urethane matrix and a fluorinated ionic antistatic additive; and
   wherein the coating has an electrical volume resistivity of less than or equal to about $10^{11}$ ohm/cm at about −40° C., wherein the aliphatic polyester urethane matrix comprises a sulfonated polyester urethane polyol, and wherein the fluorinated ionic antistatic additive comprises a quaternary ammonium salt of a fluorinated sulfonimide.

6. The laminate of claim 5, wherein the coating is transparent.

7. The laminate of claim 5, wherein the coating has a thickness from about 75 um to about 100 um.

8. The laminate of claim 6, wherein the coating has a luminous transmittance value of greater than about 65%.

9. The laminate of claim 8, wherein the coating has a haze value of less than about 1.50%.

10. The laminate of claim 5, wherein the coating does not include ionizable metal salts of perfluoroalkylsulfonate or a colloidal indium tin oxide nanoparticle dispersion.

11. The laminate of claim 10, wherein the coating is transparent and the substrate is a transparent acrylic.

12. The laminate of claim 11, wherein the surface is an outer surface of an aircraft transparency.

* * * * *